(12) United States Patent
Guglielmo

(10) Patent No.: US 9,272,889 B2
(45) Date of Patent: *Mar. 1, 2016

(54) TACTILE FEEDBACK FOR JOYSTICK POSITION/SPEED CONTROLS

(71) Applicant: Enovation Controls, LLC, Tusla, OK (US)

(72) Inventor: Kennon Guglielmo, San Antonio, TX (US)

(73) Assignee: Enovation Controls, LLC, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/275,088

(22) Filed: May 12, 2014

(65) Prior Publication Data

US 2014/0284142 A1     Sep. 25, 2014

Related U.S. Application Data

(63) Continuation of application No. 13/846,177, filed on Mar. 18, 2013, now Pat. No. 8,723,638, which is a continuation of application No. 12/773,170, filed on May 4, 2010, now abandoned.

(60) Provisional application No. 61/217,552, filed on Jun. 1, 2009.

(51) Int. Cl.
| | |
|---|---|
| G05G 9/047 | (2006.01) |
| B66F 9/22 | (2006.01) |
| B66F 11/04 | (2006.01) |
| H01H 3/00 | (2006.01) |

(52) U.S. Cl.
CPC . *B66F 9/22* (2013.01); *B66F 11/04* (2013.01); *G05G 9/047* (2013.01); *G05G 2009/0477* (2013.01); *G05G 2009/04766* (2013.01); *G05G 2009/04777* (2013.01); *G06F 2203/015* (2013.01); *H01H 2003/008* (2013.01); *Y10T 74/20201* (2015.01)

(58) Field of Classification Search
CPC ............ G05G 9/047; G05G 2009/047; G05G 2009/04766; G05G 2009/0477; G05G 2009/04777; G06F 2203/015; H01H 2003/008
USPC .................. 340/3.7, 3.71, 407.2, 685; 701/50; 182/18, 19, 2.2, 2.3, 127, 141; 74/471 XY; 345/161

See application file for complete search history.

(56) References Cited

U.S. PATENT DOCUMENTS

| | | | | |
|---|---|---|---|---|
| 5,727,387 | A * | 3/1998 | Hosseini et al. | 60/327 |
| 6,405,114 | B1 * | 6/2002 | Priestley et al. | 701/50 |
| 7,019,238 | B2 * | 3/2006 | Kobayashi | 200/310 |
| 7,041,029 | B2 * | 5/2006 | Fulghum et al. | 477/7 |
| 2004/0221674 | A1 * | 11/2004 | Kornelson | 74/471 XY |
| 2009/0244106 | A1 * | 10/2009 | Kuwae et al. | 345/690 |

* cited by examiner

*Primary Examiner* — Andrew Bee
(74) *Attorney, Agent, or Firm* — William H. Quirk; Jesse L. Frizzell; Rosenthal Pauerstein Sandoloski Agather LLP

(57) ABSTRACT

A joystick controller is disclosed for controlling speed of a boom lift platform, the controller having motors or the like that provide tactile feedback that is intuitively interpreted and adjusted by the user of the joystick speed control, the joystick being neutrally-biased to effect a null velocity when the joystick is positioned in a neutral position, but the tactile feedback forcing the joystick away from neutral to a degree that represents the platform's actual speed.

15 Claims, 8 Drawing Sheets

TACTILE FEEDBACK FOR JOYSTICK POSITION/SPEED CONTROLS

CLAIM OF PRIORITY TO PRIOR APPLICATION

This application claims the benefit of the filing date of U.S.; as well as U.S. Non-Provisional Application Ser. No. 12/773,170, filed on May 4, 2010, entitled "Tactile Feedback for Joystick Position/Speed Controls", the entirety of which is hereby incorporated by reference into the present disclosure; as well as U.S. Provisional Application Ser. No. 61/217,552, filed on Jun. 1, 2009, entitled "Tactile Feedback for Joystick Position/Speed Controls," the entirety of which is hereby incorporated by reference into the present disclosure.

BACKGROUND OF THE INVENTION

1. Technical Field

Many aspects of this invention relate in general to proportional joystick speed controls for powered implements and, more particularly, to comprehensive systems and methods for providing an operator with feedback related to the actual speed of the object(s) being moved or the platform, bucket or the like that supports it. Some aspects of the invention also relate to the machines, systems, applications, components, and methods associated with such proportional speed controls.

2. Background Art

Powered implements can be found in a huge variety of applications, from forklifts, backhoes, excavators and off-highway construction equipment and the like to cherry-pickers and other boom lift movers, carriers or platforms. Many powered implements use proportional speed controls in the form of a joystick or an equivalent type of lever or knob that controls the actuators to do the powered moving. Actuators are often hydraulic but may also come in other forms such as electric, pneumatic, electro-magnetic, or some combination thereof. Even though the present invention is beneficial for many lever-based or knob-based variable speed controllers for virtually any powered lifters, boom lift platforms provide a representative context that will be referenced for the bulk of the descriptions in this application. Those of skill in the art will understand how the advantages and features in the boom lift platform context can be translated to other contexts within the scope of the inventions.

It takes an incredibly experienced boom lift operator to quickly yet precisely control the movement of an elevated platform to within an inch or so of the desired position without overshooting and correcting. Overshooting the intended position can be hazardous, particularly when that position is close to a structure that can be damaged if impacted by the boom-lift platform. Due in part to the nature of hydraulic actuators that are typically used for boom-lift platforms, there is a constant tension between responsive controls and smooth operation. Without sophisticated controls that are common today, platform movements can be very jerky.

On the other hand, because of the great effort to smooth out the movements of aerial platforms, it is very difficult to predict how much further a platform will travel before stopping once the joystick controller is released to the neutral position. The slow, gradual approach with fine movement control can be extremely time-consuming. In the interest of time, skilled operators therefore try to speed the platform toward the desired position and let go of the joystick a foot or two before the platform reaches the desired location, hoping they have predicted well enough to avoid a collision.

Joystick speed controls have long been one of the most popular types of manual devices for controlling speed. Numerous techniques are known for enhancing the basic joystick controller, as are evidenced by the following patents within the background art: U.S. Pat. Nos. 5,019,761; 5,513,100; 5,721,566; 5,727,387; 5,899,008; 6,859,198; and 7,019,238. Boom lift platforms and comparable position and/or speed controls are commercialized by JLG, Genie, Caterpillar, Case Corporation, John Deere, Bobcat, and Hitachi.

A sizable, unmet need has been revealed in relation to optimizing such movements, particularly in the interest of getting a boom lift platform to a desired position quickly yet safely. Related needs include the goal to minimize unnecessary cost and complexity, to enhance ease of use, and to shorten the training curve for safe boom lift operators. It is an object of the present invention to address these and other needs presented by the prior art. Other objects include enabling such primary objects while also allowing a highly skilled operator to override selectable features of preferred embodiments.

Known feedback technology helps, but more has long been needed. Overriding objects of the present inventions also include providing speed control systems, components and methods that facilitate and adjust, based on an accurate yet responsive position control system.

SUMMARY OF THE INVENTION

The present invention is just the answer for many of the unmet needs that have plagued the prior art—aspects of the invention allowing precise yet smooth speed control with tactile feedback that is intuitively interpreted and adjusted by the user of the joystick speed control. Applicant is thought to have developed a reliable way to control the operation of neutrally-biased joystick controllers of the type that effect a null velocity when the joystick is positioned in a neutral position, a first velocity when the joystick is moved to a first extent from said neutral position, and a greater velocity when the joystick is moved to a greater extent in the same direction. Basic aspects of the invention adapt such joystick controllers by providing tactile feedback in the form of a feedback system that temporarily overrides the neutral bias of the joystick and instead biases the joystick to the position(s) that correspond to the actual speed of the subject whose speed is being controlled by the joystick.

Other aspects of the invention combine such tactile feedback with active influence on the speed of the subject whenever the joystick is forced to a position outside of its actual-speed-biased position. While there are many alternative variations, modifications and substitutions within the scope of the invention, one of ordinary skill in the art should consider the scope of the invention from a review of the claims appended hereto (including any amendments made to those claims in the course of prosecuting this and related applications) as considered in the context of the prior art and the various descriptions of this application.

Many other objects, features and advantages of the present invention will be evident from the remainder of this application in light of a more exhaustive understanding of the numerous difficulties and challenges faced by the prior art, which in turn will be evident to those skilled in the art.

BRIEF DESCRIPTION OF THE SEVERAL VIEWS OF THE DRAWINGS

For a more complete understanding of the present invention and its preferred embodiments, and the advantages thereof, reference is now made to the following descriptions taken in conjunction with the accompanying drawings, in which:

FIG. 3 represents the basic functionality associated with a joystick controller in the prior art.

FIG. 4 represents the functionality of a joystick controller 10 of the present invention implementing a first aspect of tactile feedback of the joystick system and method of the present invention.

FIG. 5 illustrates a manner in which joystick position is manipulated by hand from a full forward, to a hold forward position, and finally to a forced neutral position characteristic of certain aspects of the present invention.

FIG. 6 illustrates utilization of a user controlled switch that allows for an instantaneous change from the first functionality described above with FIG. 4 to the second functionality described with FIG. 5.

DETAILED DESCRIPTION OF ILLUSTRATIVE EMBODIMENTS

Figure 1:
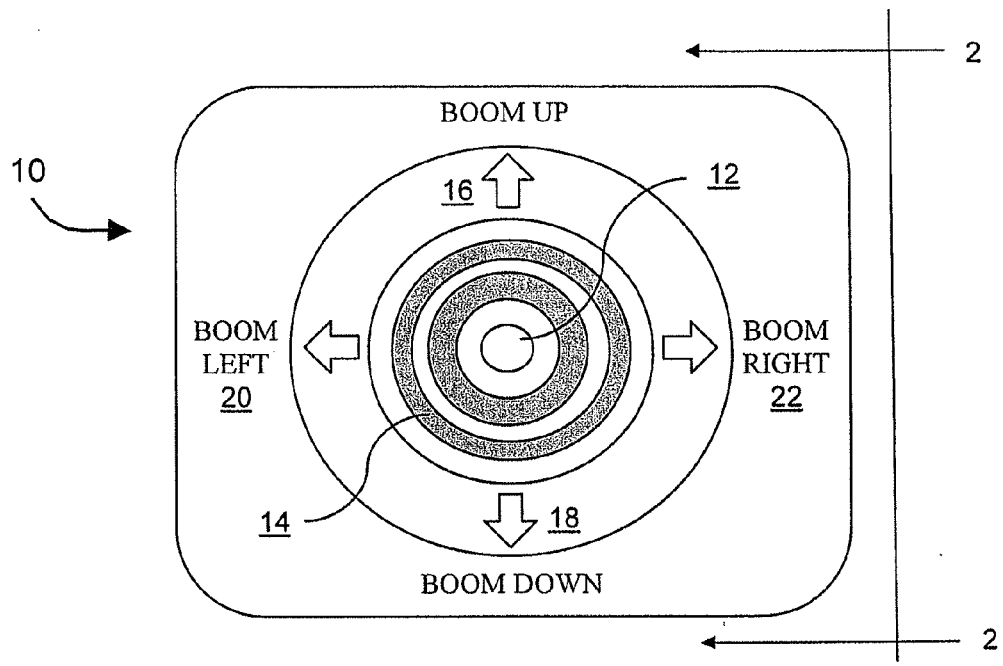
FIG. 1 is top-down view of a joystick control 10 that is illustrative of a joystick that can be used to achieve the present invention, viewed at an angle perpendicular to the plane of the associated control panel.

The Larger Contexts.

While the inventions that are the subject of this application are much more basic than any particular embodiment, one can gather a partial appreciation for some of the possible benefits of the broader inventions and possible interplay between various elements of the inventions in the course of considering presently preferred embodiments. A few embodiments that are presently thought to include the most preferred are depicted in relation to FIGS. 1-11 of the drawings, where similar reference numerals are used for similar elements of various embodiments. The systems and methods depicted therein allow for efficient and effective speed control that provides intuitive tactile feedback to the operator, together with related measures for controlling the motion of an intended subject.

The present invention finds application in any of a number of control system environments where a level of responsive feedback is desired with the user manipulation of joystick type controls. For purposes of this description and the accompanying claims, the term "implement" will be generic reference to whatever is being moved by the embodiment of the present invention herein described which includes, but is not limited to, forklifts, backhoes, excavators, skid-steer loaders, other off-highway construction equipment, cherry-pickers and other boom lift movers, carriers or platforms.

Basic Aspects of the Invention.

The following example of an application of the present invention to a telescoping boom lift vehicle is simply one of a number of different application environments within which the invention finds utility. Utility can be found according to broad aspects of the present invention in virtually any system where the movement of a stick, lever or knob control mimics the direction and speed motion of a remotely operated subject.

A basic aspect of the present invention is to adapt joystick controller systems and methods to provide the user with tactile feedback on the direction and speed of motion of a joystick controlled subject, particularly in relation to decreases in the speed of such motion. Variations on such basic aspects are described in the following detailed description and are intended to be viewed in conjunction with the appended drawing figures.

Standard Joystick Controllers.

Reference is made first to FIG. 1 for a brief description of the nomenclature typically associated with the structure and function of a standard joystick based hydraulic motion control system. FIG. 1 is a partially schematic diagram showing the basic orientation of a joystick controller device 10 with the joystick handle 12 centrally positioned on the joystick controller area of an instrument control panel. (See FIG. 11 and the description thereof as an example of a more complete instrument control panel.) Joystick boot or dust cover 14 surrounds joystick handle 12 and allows linkage to and protection for the functional components of the joystick controller. A typical joystick of the type that might be used in conjunction with a dual motion system (such as the telescoping boom lift vehicle that is provided as an example in the present application) involves the multi-directional movement for the joystick handle 12 shown in FIG. 1. The multiple directions (essentially movable in any radial direction 360° about the center point of the joystick handle 12) may be isolated and divided into four orthogonal directions carrying out four basic motions for the hydraulically driven subject.

In FIG. 1, and in the example utilized generally in the present application, movement of the joystick handle 12 upward may carry out a "boom up" actuator motion 16 as shown, or alternately, a "drive forward" motion. Movement of the joystick in the opposite direction carries out a "boom down" actuator motion 18 as shown, or alternately, a "drive in reverse" motion. Left and right motions of the joystick handle 12 carry out a boom left actuator motion 20 or a boom right actuator motion 22, or alternately a left and right steering motion. As described in more detail below, the boom up motion 16 and boom down motion 18 in the present example essentially operate to extend or retract the length of the boom on which the elevated platform is positioned. The boom left motion 20 and the boom right motion 22 on the other hand, carry out a sideways motion that swings the boom (and the elevated platform) to the left or right as directed. It is this combination of motions that is most useful to an operator, either positioned on the ground operating the telescoping boom lift or on the platform itself moving the platform to a position appropriate for work to be carried out.

Figure 2:
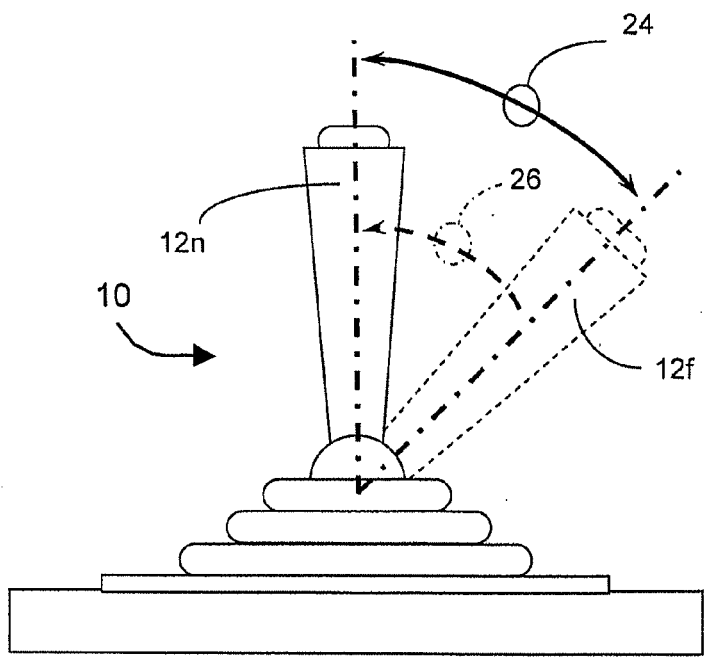
FIG. 2 is an elevation view of the joystick control 10 of FIG. 1, viewed on plane 2-2 indicated in FIG. 1.

FIG. 2 is a side elevation view of the basic joystick controller device 10, in this case showing the various positions and motions associated with joystick handle 12. A first position for joystick handle (neutral position) 12n may be characterized as the resting, non-active position of the basic joystick controller. A second position for joystick handle (fully activated position) 12f is shown whereby the joystick handle is moved (by hand) to a full rotated or maximum tilted position in one specific direction from its neutral position. Motion arrow 24 in FIG. 2 represents the joystick motion as may be directed by hand, i.e., towards a fully activated position 12f or back to a neutral position 12n. Motion arrow 26 represents a biased motion typically associated with such joystick controllers whereby the joystick is biased to return to the neutral position 12n when the force of the hand manipulation is released or relaxed. Further details on these alternate manners of returning the joystick to a neutral position are provided below.

Figure 3:
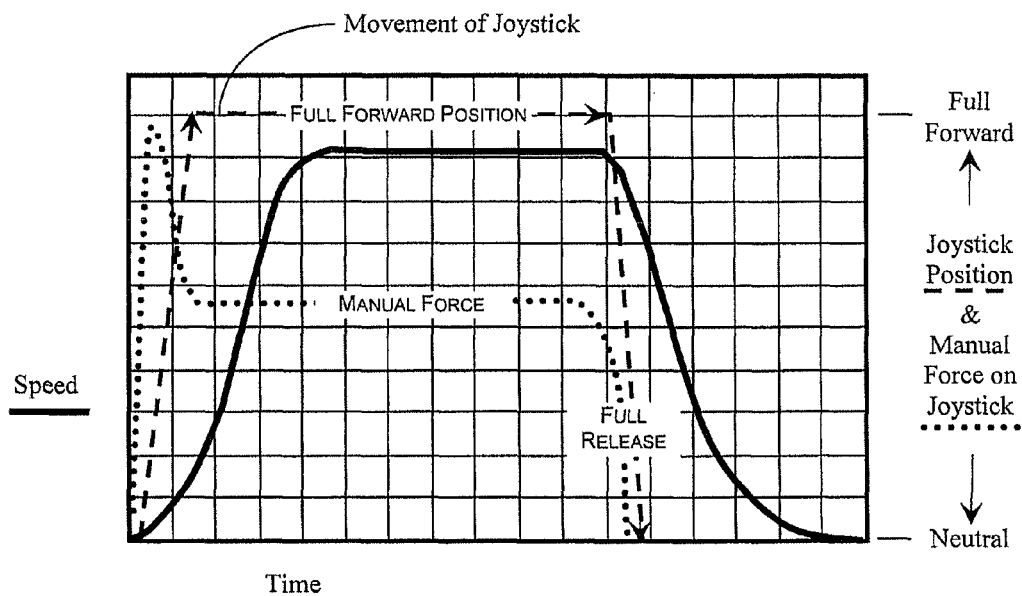
FIGS. 3-6 are graphic illustrations of the manner in which the prior art joystick controllers and the joystick controller of the present invention operate during use.

FIGS. 3-6 provide a graphic description of the manner in which the prior art joystick controllers and the joystick controller of the present invention operate during use. FIG. 3 represents the basic functionality associated with a joystick controller in the prior art. As time progresses (on the horizontal axis) through an action movement of the joystick both the motion speed of the hydraulic system under control is shown (solid line) and the joystick position itself is shown (dashed line). Starting from a neutral position, the joystick is moved to a full forward position at which point it is held for a period of time before it is fully released. The responsive action of the hydraulic system is shown in FIG. 3 by a solid line. Once the joystick is manipulated to a forward full position, the action of the hydraulic system increases in speed rapidly to a maximum speed that is held for the duration of the joystick being held in a full forward position. Once the full forward position is released and the joystick position returns to neutral (generally in an abrupt manner as the joystick is neutral biased with a spring or other mechanism to immediately return to the neutral position) the motion speed of the hydraulic system, rather than being abruptly dropped to zero, gradually decreases on a sustained slope back to zero so as to prevent the abrupt motion of the subject being moved.

Figure 4:
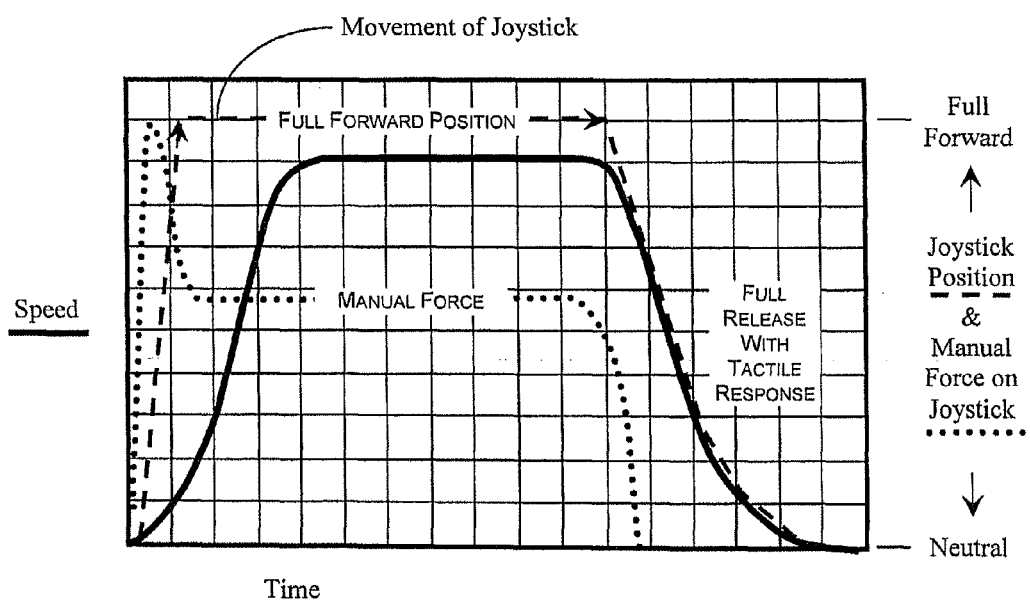

FIG. 4 represents the functionality of a joystick controller of the present invention implementing a first functional feature of the system and method of the present invention and is shown to distinguish the system of the present invention from the prior art. In FIG. 4 the same forward full motion of the joystick initiates a rapid increase in motion speed (solid line) of the controlled hydraulic system. As the joystick position is held in the full forward position the motion speed reaches a maximum and is maintained for the duration of the joystick being held in the full forward position. Once the joystick is released from the full forward position, however, rather than a sudden drop back to a neutral position, the joystick is gradually brought back to its neutral position at a rate commensurate with the rate at which the hydraulic system itself is reduced in speed back to zero. In other words, rather than the joystick providing no indication and no feedback as to the operational functionality of the hydraulic system (as in the prior art), the joystick now provides some indication and some tactile response to the operator, as to the manner in which the release of the joystick gradually reduces the operational motion speed of the hydraulic system. This operational methodology provides a number of advantages over the prior art that are described in more detail below.

The first functionality of the system of the present invention shown in FIG. 4 is operable whether the user simply releases the joystick from a full forward position or attempts to direct the joystick back to the neutral position. The mechanism associated with the joystick (as described in detail below) provides a resistance to the return to neutral motion to a degree that mimics the rate at which the hydraulic system itself reduces and terminates the motion of the vehicle component. This tactile feedback gives the user a more accurate sense of not only the direction of motion but also the rate at which that motion is increasing or decreasing.

Figure 5:
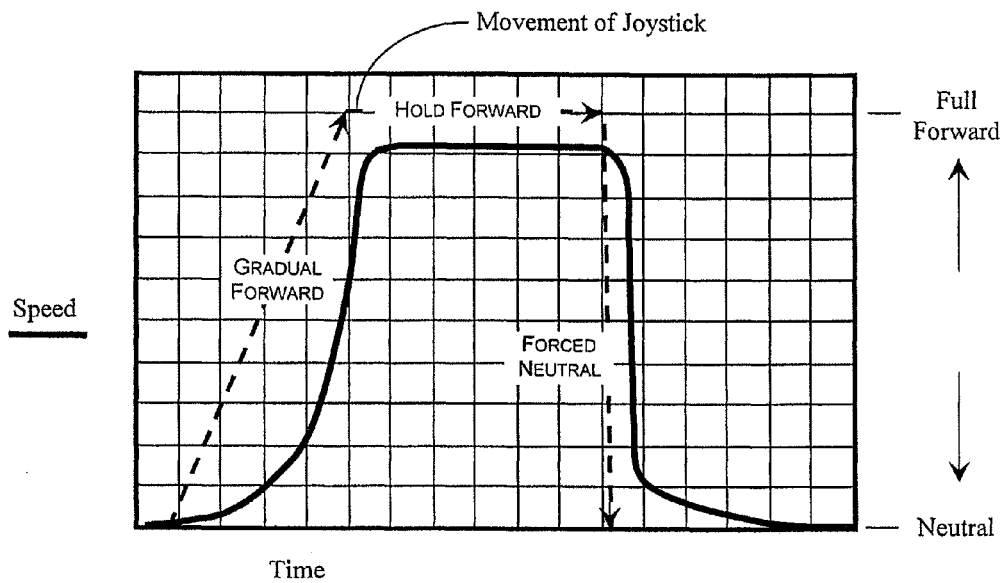

Reference is now made to FIG. 5 for a detailed description of a second functionality associated with the systems and methods of the present invention. FIG. 5 discloses a manner in which the joystick position is manipulated by hand from a full forward, to a hold forward position, and finally to a forced neutral position. Whereas FIG. 4 showed a release or a directed motion of the joystick by the operator in a manner that allows or directs the joystick (and the hydraulic system) to return to its neutral or no motion position over a controlled period of time. In some instances it may be desirable to provide a more rapid response by allowing the joystick to be immediately directed to the neutral position and to thereby terminate the motion of the vehicle component as quickly as the hydraulic system will allow. FIG. 5 represents an action method whereby the operator may force the joystick back to a neutral position (without simply releasing it) and not be met with the resistive force of the first functionality of the system described above. In this instance, rather than allowing the hydraulic system to gradually decrease its motion speed down to the point of zero motion or a stop condition, the forced neutral action on the joystick position creates an abrupt, or nearly abrupt, decline in the motion speed of the hydraulic system such that the previously moving component of the system arrives at a very abrupt, or nearly abrupt, stopped condition under the control of the operator handling the joystick. Any number of environments and operational vehicles might require such an action from the joystick controller. The present invention anticipates this second functionality to be an optional addition to the first functionality associated with the actions described above with FIG. 4. In other words, the system may, as described in more detail below, provide the option of allowing a forced neutral joystick position to direct the abrupt stoppage of the hydraulic system, or to carry out the gradual decline in the motion speed of the hydraulic system as described in FIGS. 3 and 4.

Override.

Figure 6:
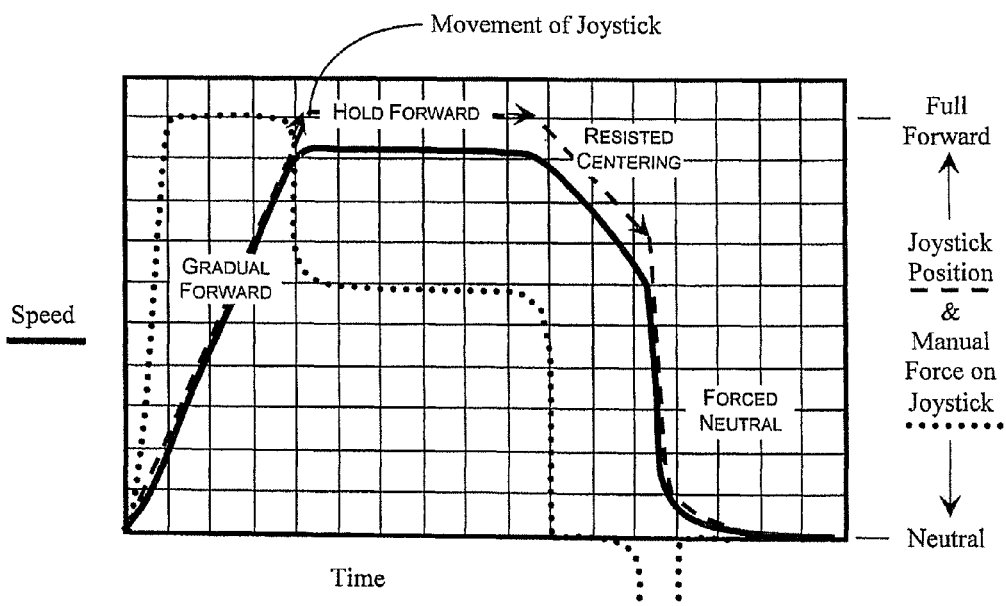

Reference is now made to FIG. 6 which describes the utilization of a user controlled switch that allows for an instantaneous change from the first functionality described above with FIG. 4 to the second functionality described with FIG. 5. With the system defaulting to the first functionality (resistance to a return to neutral) the operator may initially draw the joystick back to neutral and receive the tactile feedback that indicates the gradual reduction in the previously directed motion. If such a reduction in motion is sufficient and safe, the user may choose to continue with this functionality through to the neutral position. If, however, the user determines that such a gradual reduction in the motion of the vehicle component is not sufficient or is not safe, then either (a) an override switch may be activated to override the first functionality and abruptly stop the movement, or (b) the joystick can be forced to its neutral position to achieve a second functionality (that of FIG. 5) so as to allow a more immediate return to neutral and thereby, a more immediate reduction or stoppage of the motion directed by the hydraulic system. The user activated switch may preferably be positioned on the end of the joystick where the user may quickly activate it without removing their hand from the control.

Figure 7:
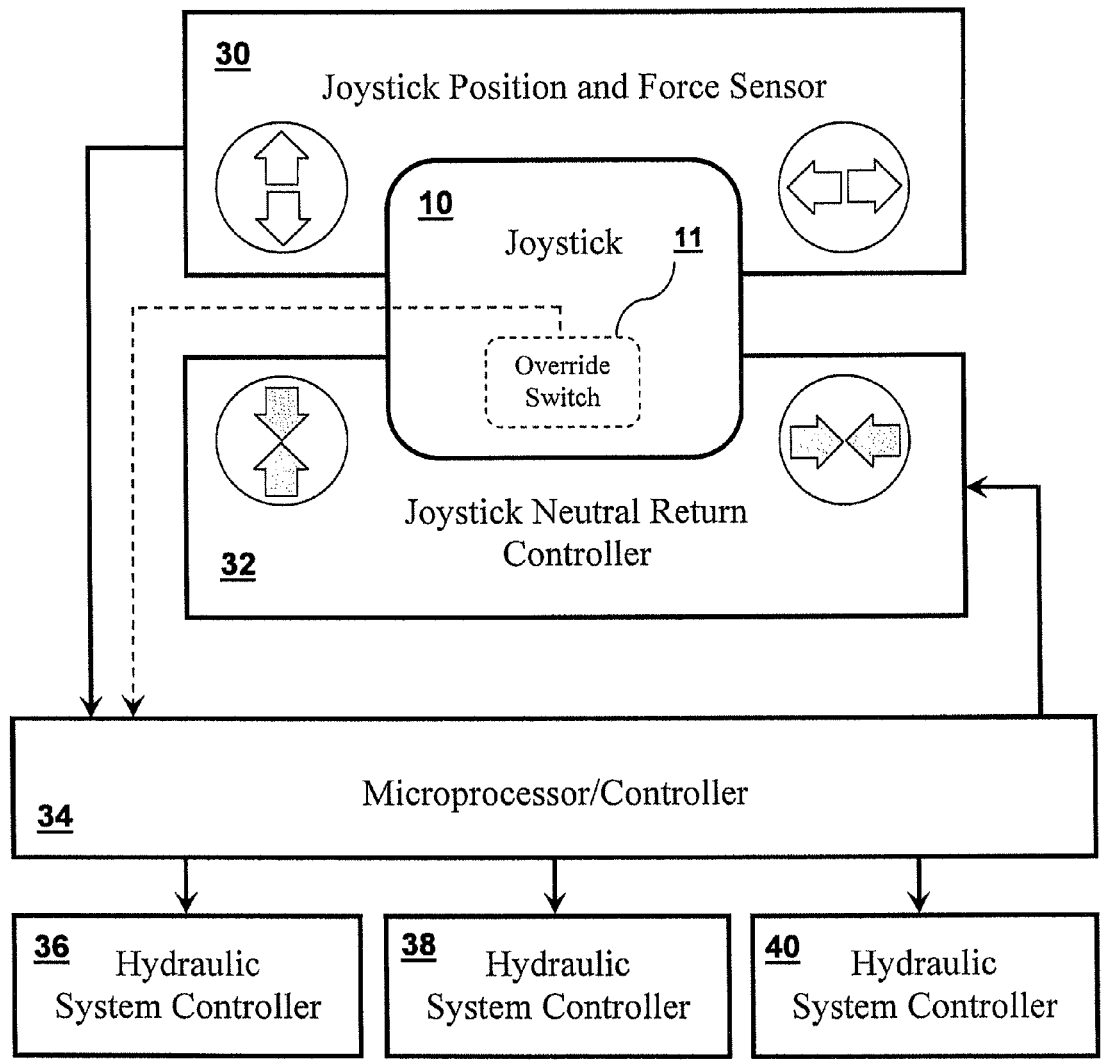
FIG. 7 illustrates basic components of a control system of the present invention for carrying out the methodology described with reference to FIGS. 4-6.

Reference is now made to FIG. 7 for a detailed but generic description of the basic components of the system of the present invention required for carrying out the inventive methodology. Joystick 10 in the present invention is generally associated with a joystick position sensor 30 and a joystick neutral return controller 32. Position sensor 30 essentially identifies the manipulated positioning of joystick 10 through the various two axis coordinates mentioned above. In a similar manner, joystick neutral return controller 32 operates to direct the position of joystick 10 through the same two axis motions. Optional override switch 11 is shown as it would be positioned in association with joystick 10, although equivalent functionality is achievable when the operator releases the powered mover's safety switch (typically in the form of a foot pedal or grip button that has to be pressed in order for any of the actuators to be engaged).

Both joystick position sensor 30 and joystick neutral return controller 32 are associated with microprocessor/controller 34. Joystick position information is provided to microprocessor/controller 34 and serves as the basis for directing the motion of the various hydraulic system controllers associated with the subject under control. Joystick neutral return controller 32 receives control signals from microprocessor/controller 34 and directs the actual automated positioning of joystick 10 as a result. Optional override switch 11 is likewise electrically connected to microprocessor/controller 34 such that activation of the switch will terminate the resistive feedback force that joystick neutral return controller 32 would normally provide.

In this component arrangement to the joystick controller, each of the motions and control actions described above with FIGS. 4, 5 and 6 can be implemented. Microprocessor/controller 34 directs the control of multiple hydraulic system controllers (36, 38, and 40), each of which is associated with one or more hydraulic cylinders or drives that direct the motion (direction and speed) of various components on the subject under control. Hydraulic system controller 36, as an example, may provide the standard hydraulic cylinder directed extension or retraction of the boom in a telescoping boom lift vehicle. Hydraulic system controller 38, as an example, may provide the left and right swing motion associated with the platform of a typical telescoping boom lift vehicle. Hydraulic system controller 40, as a further example, may provide a separate tilt mechanism associated with the elevated platform, one that is not typically combined into the two-axis joystick controller mentioned above, but may simply be a single axis bi-directional control mechanism.

Overall Control System.

Figure 8:
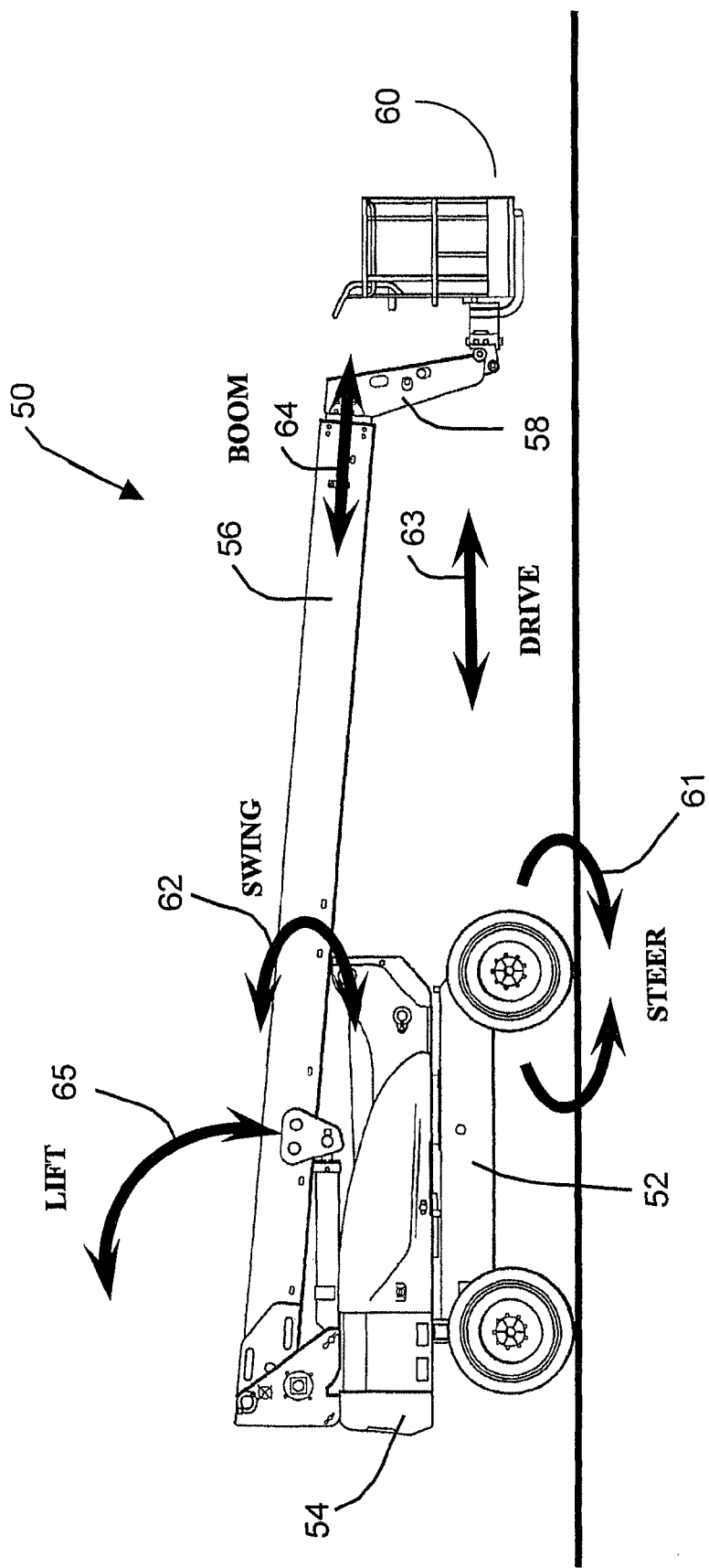
FIG. 8 shows a side view of a typical telescoping boom lift vehicle of the type that is utilized in many different construction projects as well as maintenance and utility work, with the joystick controller 10 of the present invention incorporated therein.

FIG. 8 provides an example of a typical vehicle that might utilize one or more of the joystick controller systems of the present invention. FIG. 8 provides a side view of a typical telescoping boom lift vehicle of the type that is utilized in many different construction projects as well as maintenance and utility work. A typical boom lift truck 50 is configured with a wheeled boom lift base 52. Positioned on wheeled boom lift base 52 is rotating base support 54. Positioned on and extending from rotating base support 54 is main boom 56. Configured within main boom 56 is telescoping boom 58. Positioned and attached to telescoping boom 58 is boom lift platform 60. The user/operator of boom lift truck 50 may control the motions of the subject from platform 60 or from the ground in association with boom lift base 52. In either case, there are four basic motions associated with boom lift truck 50 that may be controlled by way of the multi-directional joystick controllers of the present invention. A first such multi-directional joystick controller may provide the necessary integrated controls for lift motion (shown in association with platform 60 in FIG. 8) and swing motion (shown in association with main boom 56 in FIG. 8). As described above in the examples associated with the telescoping motion of a boom lift truck, a single joystick controller of the present invention may allow the operator (again, either on the ground or in boom lift platform 60) to simultaneously direct the lifting motion and the swing motion. In some embodiments, the lift motion may actually be a controlled combination of the extension/retraction of telescoping boom 58 and the raising/lowering of main boom 56.

A second joystick controller of the present invention may combine the motion elements associated with the actual translational movement of the boom lift truck 50 across a driving surface and would involve a drive motion and a steering motion that would include forward and reverse, as well as left and right steering (each as shown in connection with boom lift base 52 in FIG. 8). Various additional motions of the basic vehicle under control may be anticipated through additional uses of the joystick controller of the present invention.

Return of Joystick to Neutral Position.

Figure 9:
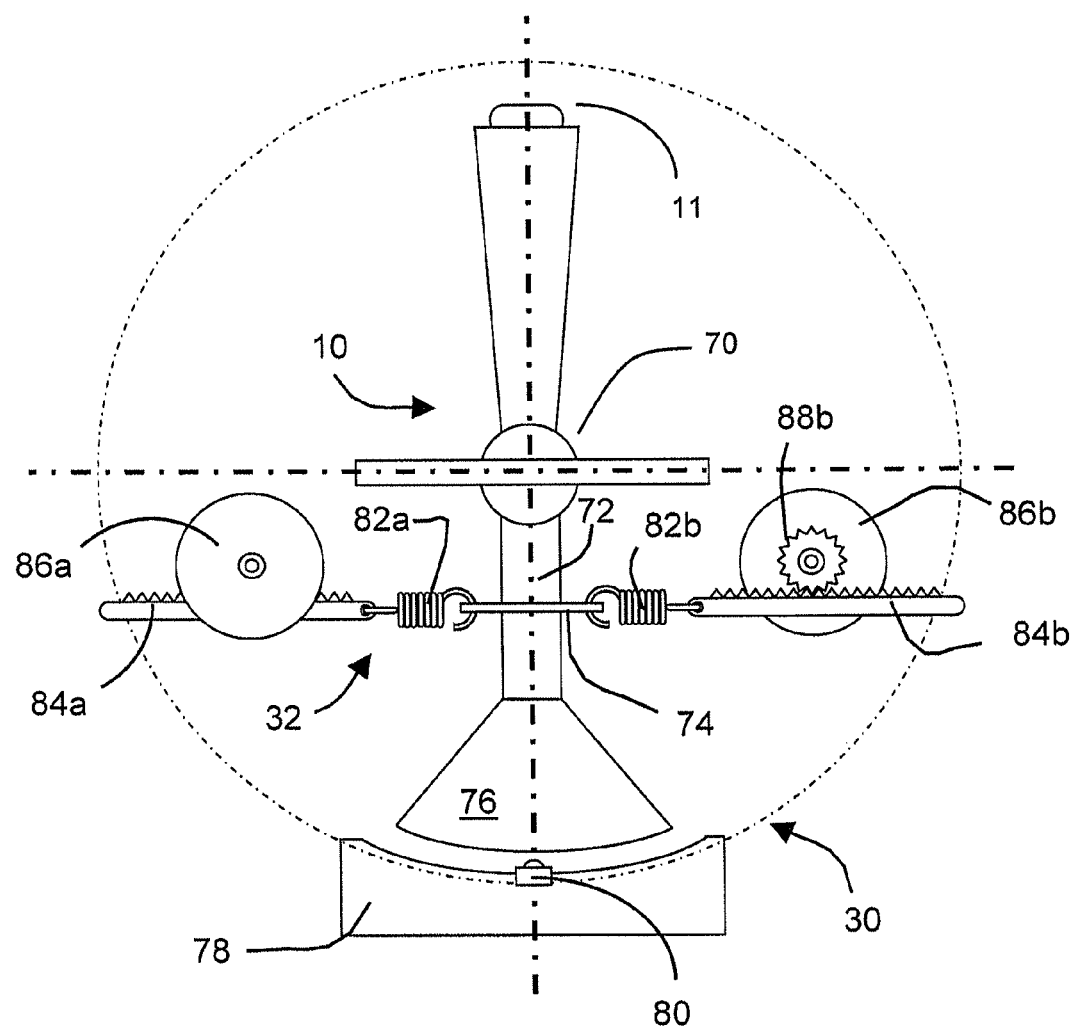
FIG. 9 illustrates a side elevation view of the joystick control controller components for controlling the position of the joystick in response to actual speed.
Figure 10:
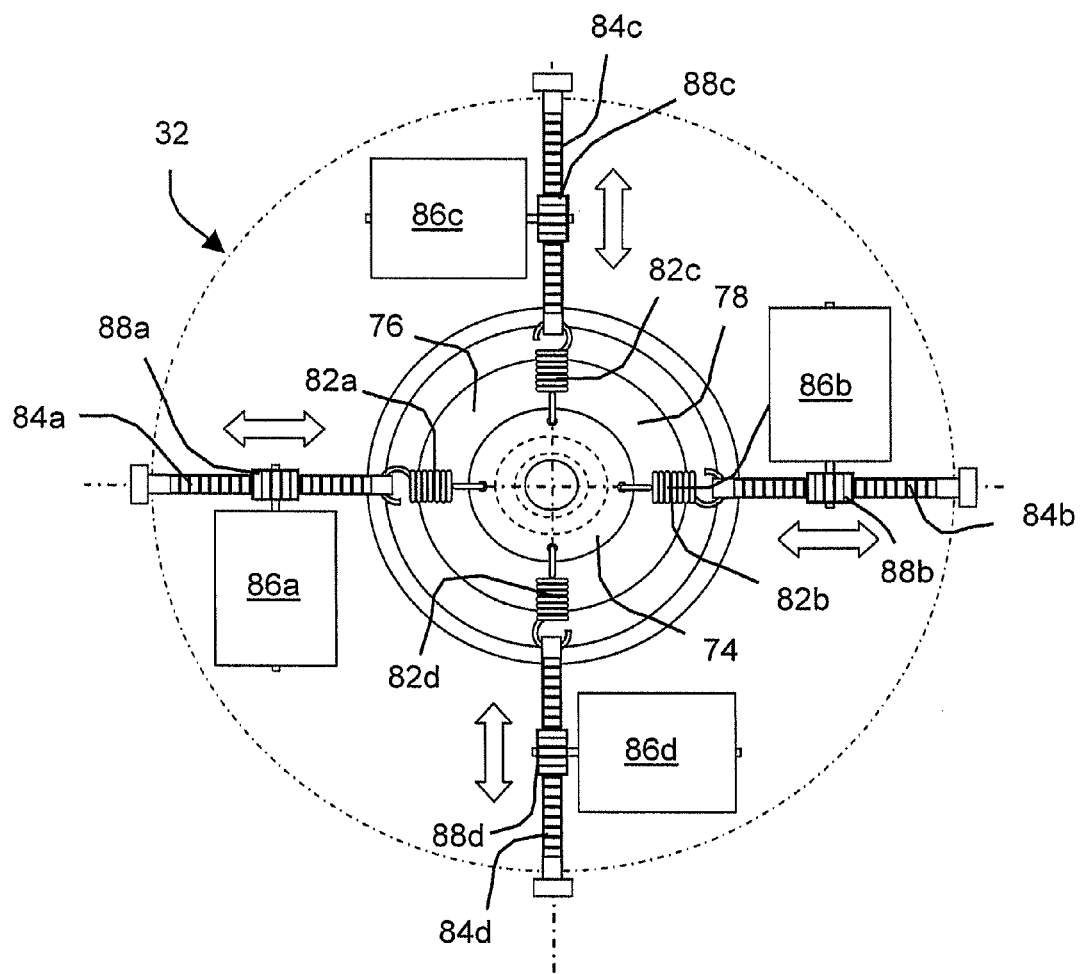
FIG. 10 discloses an overhead view of one of the alternative structures for a joystick controller 10 according to various teachings of this invention.

Reference is now made to FIGS. 9 and 10 for a detailed description of a first example of a manner of implementing the joystick neutral return controller 32 mentioned generically above. FIGS. 9 and 10 show the use of a combined spring bias and linear actuator or passive dampener system that both senses the position of the joystick controller and directs its position by means of position control signals from the microprocessor. The objective of the system shown is to allow manipulated movement of the joystick and at the same time direct its movement when the manipulation force is released or reduced. In other words, the system must accommodate free motion of the joystick by the operator/user and yet still direct the motion when no overriding force is experienced from the manipulation by the operator. The solution to this combined functionality involves both spring biased mechanisms and free motion linear actuator mechanisms positioned in association with the dual axis structure of the joystick motion control. A separate joystick position sensing device is also shown and described in FIGS. 9 and 10.

Override.

Referring to FIG. 9, joystick 10 is shown to have a joystick pivot center 70. Override switch 11 is shown as it would preferably be positioned at the apex of the joystick where the operator may easily access it without releasing the joystick. Joystick control shaft 72 extends below the working surface of the control panel associated with the device implementing the system. On joystick control shaft 72 is positioned control ring 74, seen best in FIG. 10. Attached to joystick control shaft 72 and positioned below it in the structure shown in FIGS. 9 and 10 is joystick base moving surface 76 which provides a primary functional component of the joystick position sensor system 30. Position sensor base 78 and motion sensor 80 provide the balance of the basic components associated with the joystick position sensor 30.

Joystick Speed Control.

The joystick position control or neutral return controller 32 includes, as mentioned above, motion dampeners (tension springs and/or flow-limited pistons) 82*a*-82*d*. Further included in the return controller system 32 are actuators and/or dampeners (gear rails, in the example given) 84*a*-84*d*. These linear actuators 84*a*-84*d* are driven by actuator drivers (rotary electric motors in the example given) 86*a*-86*d*. Actuator drivers 86*a*-86*d* are connected to the actuators 84*a*-84*d* by actuator connectors 88*a*-88*d*. In the preferred embodiment, actuator connectors 88*a*-88*d* are engagement gears positioned on the drive shafts of the motors and engaging the gear rails.

The system shown in FIG. 9, a side view, is limited to two of the four linear actuator systems of the invention for clarity. In this view, one of the two motors 86*a* and 86*b* is shown in a manner that shows engagement gear 88*b* which is hidden in the second system. FIG. 10 on the other hand, which is a top view through the control panel of the system implementing the joystick controller, discloses each of the four linear actuators generally positioned at opposite ends of the two motion axes of the joystick controller. In this manner, the joystick controller allows the operator to manipulate the joystick in the same 360° radial motion as described above and likewise allows the microprocessor/controller based system to automatically and independently manipulate the position of the joystick according to the functionality described by the present invention.

In addition to directing the motion of the joystick (when for example the user releases the control) the system of linear actuators also serves to provide the tactile feedback of the functionality of the present invention, by resisting the sudden or overly rapid movement of the joystick by the user. In other words, the linear actuators preference the joystick to a position (not just the neutral position) in a manner that resists the user's effort to more rapidly reposition the joystick (and thereby more rapidly change the motion of the vehicle component). This resistive functionality will remain in place unless and until the override switch cancels such functionality. Depending on the type of joystick actuators and/or dampeners used, this override may simply allow the drive motors (as an example) to rotate freely.

Alternative Components.

It should be understood that, even though the present inventions have been described in the context of certain types of controls with certain types of components, many aspects of the inventions can be appreciated with a wide variety of other types of controls and other types of components so long as the structure, functionality or purpose that is expressly claimed is still achieved either literally or in an equivalent but different manner. For instance, there are countless types of joystick position controls, or even more other types of lever-based or knob-based variable speed controls. Moreover, as indicated previously, some of the basic functionality of the present invention can be implemented with the quad-directional type joystick controller of the type discussed above (FIGS. 9 & 10) or with a bi-directional toggle lever controllers of the type associated with other independent motions on many types of hydraulic equipment.

As well, many of the components of the illustrated embodiments can be substituted with equivalents, even if they are expressly required by claims defining the inventions of this or related applications. Motion dampeners, for instance, can be achieved electronically rather than mechanically, and pneumatic or other fluid-based dampeners may be substituted for spring-like dampeners. Certainly, it will be well appreciated that there are a vast number of different types of linear actuators and drivers other than mechanical gear rails and motors—solenoids, fluid-driven pistons, rocker-and-pawl assemblies, and screw-actuators just to name a few—while even radial or other non-linear actuators might achieve equivalent functions and purposes depending on the scope of the claims.

Various alternate types of linear actuators for controlling the position and resistive force of the joystick are anticipated. These could include in-line (co-axial) linear shaft actuators coupled to motors; micro-hydraulic two-way linear motion cylinders and pumps; and micro-pneumatic two-way linear motion cylinders and pumps. Various alternate devices for tracking the position of the joystick are also anticipated. In addition to the position sensor device described above, optically tracked micro-gears connected to the joystick may likewise provide the microprocessor/controller of the present invention with the accurate position information needed to effect the functionality of the system. Those skilled in the art will recognize other devices known to provide accurate controlled motion or to provide accurate position information, along the lines described above.

Control Panel.

Figure 11:
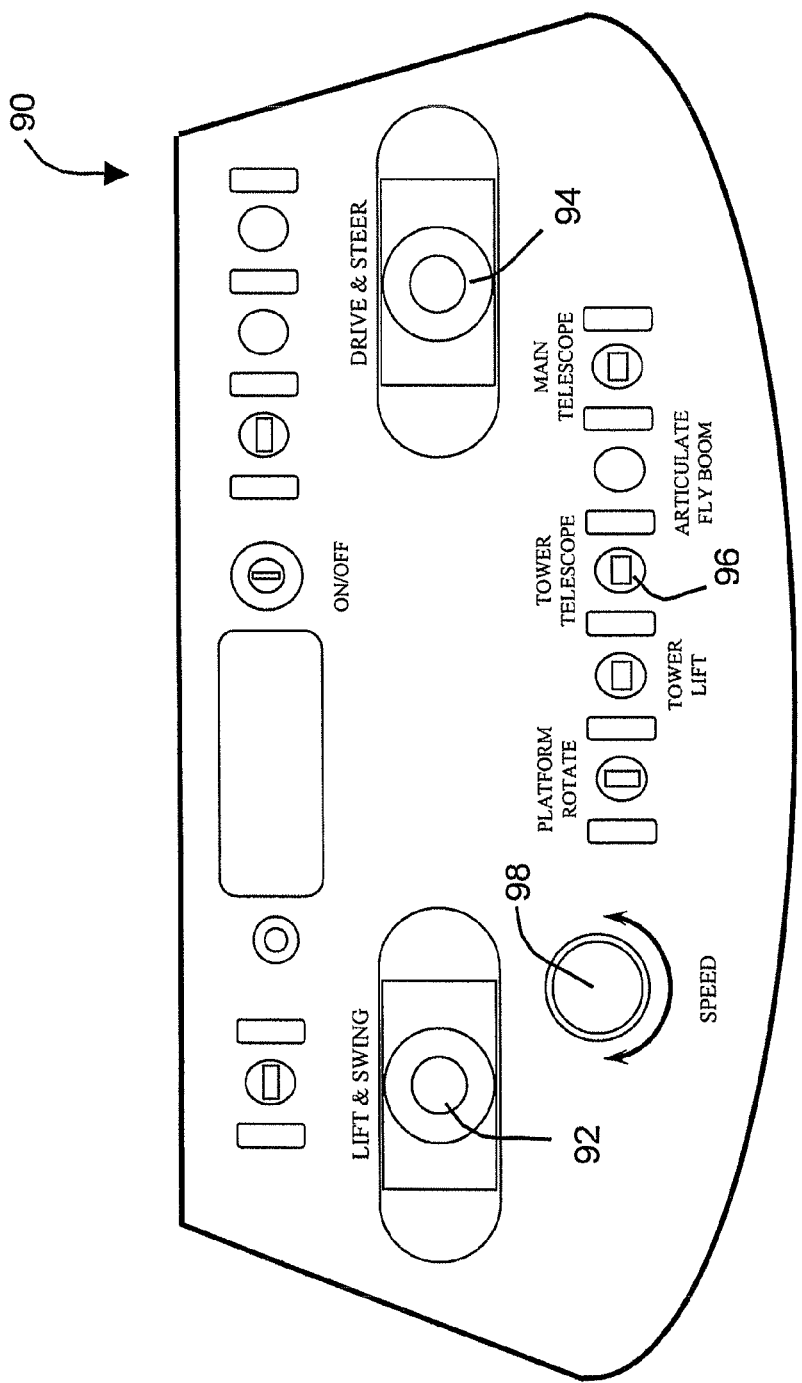
FIG. 11 illustrates two different joysticks according to the teachings of FIGS. 4-10 incorporated into a typical instrument control panel for a boom lift vehicle of the type shown in FIG. 8.

FIG. 11 provides an example of a typical instrument control panel for a boom lift vehicle of the type shown in FIG. 8. On this control panel 90, two separate quad-directional joystick controllers 92 & 94 are shown, the first joystick 92 handling the "Lift & Swing" motions and the second joystick 94 handling the "Drive & Steer" motions of the vehicle.

Elsewhere on the control panel 90 are a number of independent hydraulic control switches structured as simple bi-directional lever controllers. Typical of these types of control levers is "Tower Telescope" control lever 96. The basic functionality of the present invention could easily be applied to such bi-directional lever controls. Both the free-release neutral return mode and the forced neutral return mode may be implemented with these more simple configurations. In either mode, the rate at which motion speed of a moving component changes can be (and typically is) modified by a centralized speed control knob 98. In the present invention, the speed control 98 would still regulate the rate at which the motion of the vehicle component increases (or decreases) as the joystick is moved. That is, a very rapid movement of the joystick to a full forward position could direct a very rapid movement of the hydraulic component (a steep initial slope to the solid line in FIGS. 3 & 4) or, if the speed control is set lower, a more gradual increase in the motion of the component (a less steep initial slope in FIGS. 3 & 4).

Overall System and Method Alternatives.

It should also be understood that, rather than limiting the invention to boom lift platforms, alternative embodiments of broader aspects of the invention are adapted for use with any other object the position or speed of which are controlled with a remote control or some form of lever-based or knob-based electronic control. As examples that will be understood by those of skill in the art, even though the preferred embodiments relate to control systems and methods for boom lift platforms, various aspects of the present invention will also find utility in alternative embodiments in backhoes, skid-steer loaders, fork lifts and other off-highway construction vehicles. Indeed, some aspects may be used in virtually any system for controlling the position and/or speed of any subject, whether the subject is an aerial platform as in illustrated embodiments, or whether the controlled subject is some other object or even a flow of fluids that can be controlled using a lever-based or knob-based speed/position control with some form of proportional control.

Those of skill in the art will also understand that proportional controls may include controls where speed is continuously proportional to the relative position of the lever or knob, as well as controls where only two or three speeds are available and yet the speeds are related to discreet steps in movement of the lever away from a neutral position. For ease of reference for these purposes, while it should be recognized that knobs can be the equivalent of levers because force from the edge of the knob creates a moment about the center of the knob like a lever about its fulcrum, use of the terms "lever," "lever-based" features or the like should be interpreted to encompass knobs and knob-based features unless expressly stated or clearly intended otherwise.

Those of skill in the art will also understand that aspects of the invention may involve or be used with actuators of other types other than hydraulic actuators. So, even though some aspects of the invention provide exceptional benefits with hydraulic actuators, actuators may also be electric, pneumatic, electro-magnetic, or some combination of the various different types of known actuators. Use of the term "actuator" or the like should therefore be interpreted to encompass any type of actuator unless expressly stated or clearly intended otherwise.

Still other embodiments of the invention relate to application-specific machines that incorporate controls according to the teachings reflected herein, as well as subsystems, macro-systems or methods for performing all or part of the processes described or inferred herein. While there are many variations within the scope of the invention, one of ordinary skill in the art should consider the scope of the invention from a review of the claims appended hereto (including any amendments made to those claims in the course of prosecuting this and related applications) as considered in the context of the prior art and the various descriptions of this application.

Numerous variations, substitutions, modifications and simplifications will still fall within the scope of the inventions that are the subject of this application. Many other features, benefits and advantages of the inventions related to the embodiments referenced herein will be evident to those of skill in the art in light of an exhaustive review of the prior art.

Even though the foregoing embodiments represent the most preferred at present, those of ordinary skill in the art will recognize many possible alternatives that we have not expressly suggested here. While the foregoing written descriptions enable one of ordinary skill to make and use what is considered presently to be best modes of the invention, those of ordinary skill will understand and appreciate the existence of variations, combinations, and equivalents of the specific embodiment, method, and examples herein. It should be understood that the drawings and detailed descriptions herein are to be regarded in an illustrative rather than a restrictive manner, and are not intended to limit the invention to the particular forms and examples disclosed. To the contrary, the invention includes any further modifications, changes, rearrangements, substitutions, alternatives, design choices, and embodiments apparent to those of ordinary skill in the art, without departing from the spirit and scope of this invention, as defined by any claims included herewith or later added or amended in an application claiming priority to this present filing. The invention covers all embodiments within the scope and spirit of such claims, irrespective of whether such embodiments have been remotely referenced here or whether all features of such embodiments are known at the time of this filing. Thus, it is intended that the claims be interpreted to embrace all further modifications, changes, rearrangements, substitutions, alternatives, design choices, and embodiments that may be evident to those of skill in the art. In any case, all substantially equivalent systems, articles and methods should be considered within the scope of the present invention.

I claim:

1. A motion control system for controlling the movement of a hydraulically powered implement relative to a physical reference, said motion control system comprising:
   a) a movement control system capable of controlling the movement of said powered implement relative to said physical reference;
   b) said movement control system comprising:
      i) a joystick controller having a joystick handle for manually controlling velocity of the powered implement relative to said physical reference, said joystick controller having two ends— a proximal and a distal end;
      ii) said joystick handle connected to said distal end of said joystick controller;
      iii) a speed sensor capable of measuring the speed of said powered implement relative to said physical reference;
      iv) said speed sensor further capable of generating a signal indicative of the speed of said powered implement relative to said physical reference and providing the signal indicative of the speed of said powered implement relative to said physical reference to a handle position controller;
      v) said handle position controller capable of influencing the position of said handle in relation to said signal; and
      vi) said handle position controller further capable of influencing said handle to be closer to a first extent in a first direction than a neutral position if the actual speed of said powered implement relative to said physical reference is closer to a first velocity than a null velocity.

2. The motion control system of claim 1, further comprising:
   a) controls and circuitry adapted to effect a null velocity when the handle is in said neutral position, said first velocity when the handle is in a first non-neutral position that is spaced in said first direction from said neutral position, and a second velocity when the handle is in a second non-neutral position that is spaced in the same first direction from said neutral position, the second non-neutral position being spaced further from said neutral position than the first non-neutral position, and the second velocity being greater than the first velocity;
   b) a positional bias associated with the handle of said joystick to bias the position of said handle toward the neutral position when said handle is released from the second non-neutral position; and
   c) a handle position influence that influences the position of the handle in relation to said signal, said handle position influence being adapted to influence the handle to be closer to the first non-neutral position than the neutral position if said signal indicates that the actual speed of the powered implement relative to the physical reference corresponds to the first velocity, thereby influencing the position of the handle to provide tactile feedback to an operator who is operating said handle, the tactile feedback being indicative of the actual speed of the powered implement relative to the physical reference.

3. The motion control system of claim 2, wherein:
   a) the handle of said joystick is positioned in a full forward position when the handle is moved to the second non-neutral position;
   b) the handle of said joystick is manually releasable from said full forward position; and
   c) said positional bias and said handle position influence are associated with the handle of said joystick in a manner such that the handle of said joystick gradually returns to its neutral position at a rate related to the rate at which a velocity of said powered implement is reduced in speed toward zero.

4. The motion control system of claim 2, wherein:
   a) said controls and circuitry are adapted to effect a non-zero velocity when the handle of said joystick is positioned in a non-neutral position;
   b) when the handle of said joystick is positioned in said non-neutral position, the handle of said joystick may be moved toward the neutral position either by manually releasing the handle from said non-neutral position or by manually forcing the handle from said non-neutral position toward the neutral position;

c) said positional bias and handle position influence are associated with the handle of said joystick in a manner such that, if the handle of said joystick is manually released from said non-neutral position, then the handle gradually returns toward its neutral position at a rate commensurate with the rate at which the powered implement itself is reduced in speed toward zero;

d) said controls and circuitry are associated with said joystick to control the velocity of said powered implement; and e) said positional bias and handle position influence are associated with the handle of said joystick in a manner such that, if the handle of said joystick is manually forced toward the neutral position from said non-neutral position, then the handle of said joystick may be manually forced completely to the neutral position while the powered implement has a non-zero velocity, and said controls and circuitry cause the velocity of said powered implement to be more rapidly reduced toward zero velocity than if the handle of said joystick was manually released from said non-neutral position.

5. The motion control system of claim 2, wherein:

a) the joystick handle of said joystick controller is centrally positioned on a joystick controller area of an instrument control panel;

b) said joystick controller further comprises a cover surrounding said joystick handle c) the joystick handle of said joystick controller is movable in multiple directions, said multiple directions including four orthogonal directions respectively corresponding to forward, backward, leftward and rightward directions relative to said joystick controller on said instrument panel;

d) said controls are adapted and connected to coordinate a plurality of actuators to move the powered implement in a horizontal plane; and e) said joystick controller being associated with said controls such that:

i) movement of the joystick handle in the forward orthogonal direction causes said plurality of actuators to move the powered implement in a forward direction in the horizontal plane; and ii) movement of the joystick handle in the backward orthogonal direction causes said plurality of actuators to move the powered implement in a direction that is opposite the forward direction in the horizontal plane.

6. The motion control system of claim 1, wherein optically tracked micro-gears are connected to said joystick and likewise provide a microprocessor/controller with accurate positon information to affect control of the system.

7. The motion control system of claim 1, further comprising:

a) a joystick position sensor identifying all manipulated positioning of said joystick handle through two translational axis coordinates; and b) a joystick neutral return controller operating to direct the position of said joystick handle through said axis coordinates;

c) said joystick position sensor being electronically connected to said joystick handle and a processor;

d) said joystick neutral return controller being electronically connected to said joystick handle and a microprocessor/controller;

e) said joystick position sensor being adapted to provide joystick position information to said microprocessor/controller, thereby serving as a basis for directing the motion of a plurality of hydraulic system controllers;

f) said joystick neutral return controller being adapted to receive control signals from said microprocessor/controller and directing actual automated positioning of said joystick as a result; and g) an override switch electronically connected to said microprocessor/controller such that activation of said switch terminates a resistive feedback force that said joystick neutral return controller typically provides.

8. The motion control system of claim 7, wherein:

a) said joystick neutral return controller uses a combined spring bias and linear actuator or passive dampener system that both senses the position of the joystick controller and directs the joystick controller's position by means of position control signals from the microprocessor/controller;

b) said spring bias and linear actuator are positioned and associated with dual axis structures of a joystick motion control; and c) said joystick positon is detected by a separate joystick position-sensing device.

9. The motion control system of claim 8, wherein said joystick neutral return controller further comprises:

a) motion dampeners including tension springs and/or flow-limited pistons connected to a plurality of actuators and/or dampeners;

b) said actuators and/or dampeners are connected to actuator drivers by actuator connectors;

c) said actuators are driven by said actuator drivers; and d) said actuator connectors are engagement gears positioned on a drive shaft of a motor and engaging said dampeners.

10. The motion control system of claim 9, wherein said neutral return controller provides tactile feedback to said joystick handle, where said joystick handle gradually returns to its neutral position—by resisting sudden or overly rapid movement of said joystick hander by user;

a) said neutral return controller mechanically prefers that said joystick handle change positions in a manner that resists the user's effort to more rapidly reposition said joystick, and thereby more rapidly change the motion of said powered implement; and b) said resistance occurs unless and until said override switch cancels such resistance.

11. The motion control system of claim 1, wherein said powered implement comprises a forklift, and wherein said physical reference comprises a cab of said forklift.

12. The motion control system of claim 1, wherein said powered implement is boom lift platform, and wherein said physical reference comprises a boom lift base.

13. The motion control system of claim 12, further comprising:

a) said joystick controller comprising a multi-directional joystick controller that provides necessary integrated controls for lift motion and swing motion; and b) said joystick controller allowing an operator to simultaneously direct a lifting motion and a swing motion.

14. The motion control system of claim 12, further comprising:

a) a microprocessor/controller directing control of multiple hydraulic system controllers, each of which is associated with one or more hydraulic cylinders or drives that direct the motion, including direction and speed, of various components on a subject under control of a boom lift;

b) one or more of the hydraulic system controllers providing said one or more hydraulic cylinders directed extension or retraction of a boom in a telescoping boom lift vehicle;
c) providing a left and right swing motion associated with the platform of a telescoping boom lift vehicle; and
d) providing a separate tilt mechanism associated with said platform.

15. The motion control system of claim 1, further comprising said joystick controller combining motion elements associated with actual translational movement of said physical reference across a driving surface, and involving a drive motion and a steering motion that would include forward and reverse, as well as left and right steering.

* * * * *